Feb. 21, 1956  C. D. KECK  2,735,316
SAW SHARPENING DEVICE
Filed Sept. 11, 1952

INVENTOR.
Charles D. Keck
BY
ATTORNEYS

United States Patent Office 2,735,316
Patented Feb. 21, 1956

2,735,316

SAW SHARPENING DEVICE

Charles D. Keck, East Mauch Chunk, Pa.

Application September 11, 1952, Serial No. 309,013

2 Claims. (Cl. 76—40)

This invention relates to saw sharpening devices and, more particularly, to a saw sharpening device provided with a power-driven grinding wheel which can be manually positioned with the flexibility and dexterity of a hand file.

The sharpening of saws is a laborious procedure, and in the case of one- and two-man crosscut saws for use in cutting heavy timber a file has a maximum life of only two to three saw sharpenings. For this reason, a number of power-driven saw sharpening devices have been proposed heretofore, but so far as I am aware all of these proposals have required some locking of the position of the sharpening tool (generally a grinding wheel) during the sharpening of each tooth contour. As a result, the time consumed in resetting such power-driven saw sharpening devices has been so great that there still prevails in this art a preference for hand filing, laborious though it may be.

I have now devised a saw sharpening device of the power-driven type which is characterized not only by its simplicity but by its flexibility of control. The saw sharpening device of my invention comprises a horizontally disposed carriage-supporting member, a carriage movably mounted on the supporting member, and a gear train interengaging the carriage and the supporting member. A grinding wheel supporting arm is pivotally mounted on the carriage for movement in a substantially vertical plane, and a grinding wheel assembly is pivotally mounted adjacent one end of this arm for arcuate movement about the axis of the arm. A grinding wheel shaft assembly is pivotally mounted on the grinding wheel assembly for arcuate movement about an axis normal to the pivotal axis of the grinding wheel assembly, the grinding wheel being rotatably mounted on a shaft carried by the grinding wheel shaft assembly normal to the pivotal axis thereof, and driving means is provided for effecting rotation of the grinding wheel. A hand grip is secured to the grinding wheel shaft assembly so as to permit any desired positioning of the grinding wheel with respect to the contour of the saw tooth to be sharpened, and a hand wheel is positioned in close proximity to the grinding wheel assembly and is operatively connected to the aforementioned gear train so that rotation of the hand wheel causes movement of the carriage along the carriage-supporting member. Suitable clamping means is provided for holding a saw to be sharpened in a fixed position below the grinding assembly.

Figure 1:
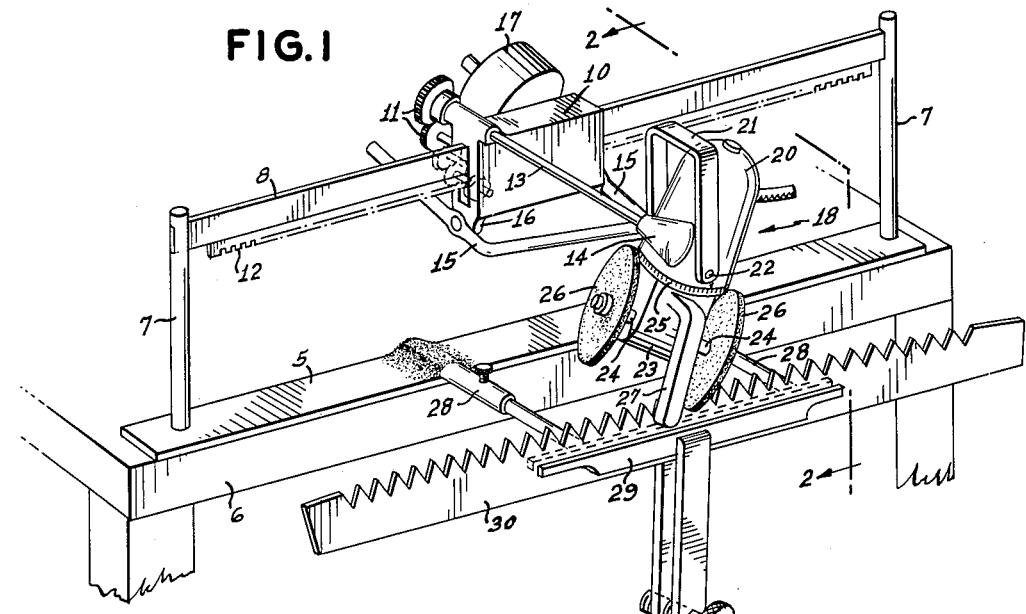
Figure 2:
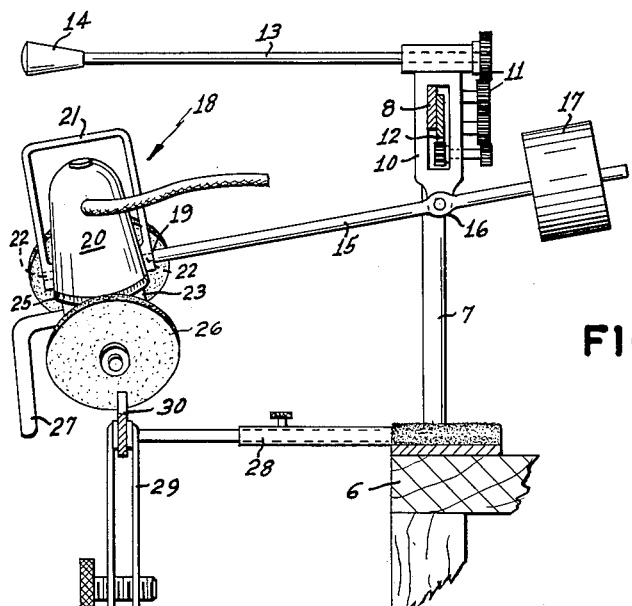

These and other novel features of my invention will be more readily understood by reference to the accompanying drawings in which Fig. 1 is a perspective view of the saw sharpening device of my invention mounted on a workbench; and Fig. 2 is a side view of the saw sharpening device taken along line 2—2 in Fig. 1.

As shown in Fig. 1, the saw sharpening device of my invention includes a main frame 5 which may be mounted on a workbench 6 or any other supporting structure. Mounted on the frame are upstanding posts 7 which carry an elongated horizontally disposed carriage-supporting member such as a rack bar 8. A carriage 10 is slidably mounted on the rack bar so that it may be moved from one end of the bar to the other. A gear train 11 mounted on the carriage 10 engages teeth 12 provided advantageously along the underside of the rack bar 8, and the gear train is operated by an outwardly projecting shaft 13 on the outer end of which there is mounted a knob or hand wheel 14. It can be readily seen that rotation of the hand wheel 14 drives the gear train 11 and therefore causes the carriage 10 to move along the rack bar 8. The gear train is advantageously so designed that counterclockwise rotation of the hand wheel causes the carriage to move to the left and clockwise rotation of the hand wheel causes the carriage to move to the right.

The carriage 10 thus serves as a movable mounting for the power-driven grinding wheels which are used to sharpen saw teeth. Toward this end, a grinding wheel supporting arm 15 is pivotally mounted on brackets 16 engaging the carriage, the rearward end of the supporting arm being provided advantageously with a counterweight 17 and the forward end of the supporting arm carrying a grinding wheel assembly indicated by the numeral 18. The grinding wheel assembly is pivotally mounted as a unit on the end 19 of the supporting arm 15 in such manner that it may be moved arcuately about the axis of the supporting arm. In the preferred embodiment of my saw sharpening device, the grinding wheel assembly includes an electric motor 20 mounted within an inverted U-shaped frame 21 at the end of the supporting arm 15 on pivot bearings 22 aligned with the axis of the supporting arm.

The grinding wheel assembly 18 further includes a grinding wheel shaft assembly which is pivotally mounted on the grinding wheel assembly for movement of the axis normal to the pivotal axis of the grinding wheel assembly. In the presently preferred embodiment of my invention, the grinding wheel shaft assembly comprises a gear box 23 adapted to transmit rotation of the motor to a grinding wheel shaft 24 mounted normal to the axis of rotation of the motor. The shaft assembly is rotatably mounted by means of a collar 25 or the like secured to the lower end of the motor housing so as to permit pivotal movement of the shaft assembly about an axis normal to the pivotal axis of the motor mounting, the latter, comprising the pivot bearing 22, being the mounting for the entire grinding wheel assembly. The grinding wheel shaft 24 advantageously projects outwardly beyond opposite sides of the gear box 23 and identical grinding wheels 26 are mounted on the two ends of the shaft. A hand grip 27 or other suitable projection is secured to the shaft assembly (advantageously to the gear box 23) so as to permit manual control over the position of the grinding wheel assembly. By providing the collar 25 with a calibrated scale reading against a scribe mark on the lower edge of the motor housing, the angle of contact between the grinding wheel and a saw tooth can be accurately established.

The main frame 5 is advantageously further provided with outwardly projecting telescoping arms 28 or the like on the extremities of which there is mounted a clamp 29 adapted to hold a saw 30 in sharpening position below the grinding wheel assembly 18.

It will be clearly apparent, accordingly, that the grinding wheel assembly 18 may be moved up and down in a vertical plane by pivotal movement of the supporting arm 15, that the grinding wheel assembly may also be moved pivotally clockwise or counterclockwise about the end of the supporting arm on its bearings 22, and that the grinding wheel shaft assembly may be rotated pivotally on its collar 25 primarily to the right or to the left about its axis of rotation which is normal to the axis of rotation of the grinding wheel assembly as a unit. Thus, by control exerted on the hand grip 27, the grinding wheel assembly 18 may be raised or lowered, may be tilted with respect to the vertical and may be turned to the right or left about a substantially vertical axis so as to permit alignment of one of the grinding wheels with the desired contour of the saw tooth directly beneath the grinding wheel assembly. The positioning of the grinding wheel longitudinal of the saw is readily controlled by the hand wheel 14. As a result, the simultaneous manipulation of the hand wheel 14 and of the hand grip 27 permits precise positioning of the grinding wheel 26 in any desired position and angle with respect to any tooth on the saw to be sharpened. In the course of sharpening a saw with the device of my invention, relatively small diameter grinding wheels may be used provided two such grinding wheels are mounted on opposite ends of the grinding wheel shaft as described hereinbefore. By such an arrangement, a grinding wheel surface may be brought into any desired position with respect to a tooth contour without interference from the body portion of the grinding wheel shaft assembly such as the gear box 23.

It will be readily appreciated that certain features of my novel saw sharpening device may be altered without departing from the spirit of the invention. For example, the power source for the grinding wheels need not be a motor mounted as a component part of the grinding wheel assembly but may be mounted elsewhere on the main frame with a flexible shaft connection from the motor to the grinding wheel shaft assembly. Moreover, the use of a counterbalance weight on the rearward portion of the grinding wheel supporting arm may be replaced by a spring. These and other modifications of the specific structure of my saw sharpening device may be adopted while nevertheless embodying the combination of separate manual control for the positioning of the grinding wheel assembly longitudinally of a saw to be sharpened and separate manual control for the positioning of the grinding wheel on a universal mounting in any desired position with respect to the contour of the saw teeth to be sharpened.

My novel saw sharpening device is therefore characterized by all of the flexibility of a hand file while nevertheless being provided with a power-driven grinding element. The unlimited flexibility in the positioning of the grinding element in my novel device thus makes it possible to sharpen either the common crosscut saws or saws having irregularly shaped teeth either with or without varying tooth design throughout their length.

I claim:

1. In a saw sharpening device of the type having clamping means to hold a saw to be sharpened in a fixed position, rotary grinding means, a drive motor for said grinding means, a carriage for supporting said grinding means, means supporting said carriage for movement in a direction parallel to the saw, and means mounted on said carriage to adjustably support said grinding means, the improvement which comprises a supporting arm pivoted on said carriage and freely movable about a horizontal axis, an inverted U-shaped frame secured by one leg to the end of said arm and positioned directly over the saw, said drive motor being pivotally mounted on the legs of said U-shaped frame and being freely movable about an axis normal to the pivot axis of the supporting arm, a grinding wheel shaft assembly mounted directly below and supported by said drive motor and being freely rotatable about an axis normal to the pivot axis of the motor in said U-shaped frame, said shaft assembly including a shaft driven by said motor and rotatable about an axis normal to the axis of rotation of said shaft assembly, said grinding means comprising a pair of grinding wheels mounted on opposite ends of said shaft, and a hand grip member secured to the shaft assembly for manipulating said grinding wheels in a universal movement with respect to the supporting carriage.

2. The device of claim 1, further including a gear train connecting said carriage to its supporting means, and a manually engageable member positioned adjacent said hand grip for actuating said gear train to move said carriage along said carriage-supporting means parallel to the saw.

References Cited in the file of this patent

UNITED STATES PATENTS

| 107,270 | Mallory | Sept. 13, 1870 |
| 1,952,323 | Litomy | Mar. 27, 1934 |
| 2,067,179 | Elder | Jan. 12, 1937 |
| 2,329,879 | Christy et al. | Sept. 21, 1943 |
| 2,460,331 | Beverleigh | Feb. 1, 1949 |
| 2,462,225 | Roderick | Feb. 22, 1949 |

FOREIGN PATENTS

| 591,375 | Germany | Jan. 20, 1934 |